(12) United States Patent
Tsai (10) Patent No.: US 10,505,364 B2
(45) Date of Patent: Dec. 10, 2019

(54) ELECTROSTATIC DISCHARGE PROTECTION APPARATUS

(71) Applicant: Faraday Technology Corp., Hsin-Chu (TW)

(72) Inventor: Chia-Ku Tsai, Hsin-Chu (TW)

(73) Assignee: Faraday Technology Corp., Hsin-Chu (TW)

( * ) Notice: Subject to any disclaimer, the term of this patent is extended or adjusted under 35 U.S.C. 154(b) by 289 days.

(21) Appl. No.: 15/694,847

(22) Filed: Sep. 3, 2017

(65) Prior Publication Data

US 2018/0351351 A1    Dec. 6, 2018

(30) Foreign Application Priority Data

Jun. 6, 2017 (TW) .............................. 106118695 A (51) Int. Cl.
*H02H 9/04* (2006.01)
(52) U.S. Cl.
CPC ...................................... *H02H 9/04* (2013.01)
(58) Field of Classification Search
CPC ........................................................ H02H 9/04
See application file for complete search history.

(56) References Cited

U.S. PATENT DOCUMENTS

| | | | | |
|---|---|---|---|---|
| 5,946,177 A | * | 8/1999 | Miller | H01L 27/0248 361/56 |
| 7,593,204 B1 | * | 9/2009 | Iversen | H02H 9/046 361/56 |
| 7,706,113 B1 | * | 4/2010 | Lien | H01L 27/0285 361/111 |
| 8,576,524 B1 | * | 11/2013 | Zupcau | H02H 9/046 361/56 |
| 2006/0176626 A1 | | 8/2006 | Griesbach | |
| 2008/0002316 A1 | | 1/2008 | Adkisson | |
| 2009/0086392 A1 | | 4/2009 | Ker | |
| 2010/0148797 A1 | * | 6/2010 | Ker | H02H 9/046 324/555 |
| 2014/0063663 A1 | * | 3/2014 | Altolaguirre | H02H 9/046 361/56 |

(Continued)

FOREIGN PATENT DOCUMENTS

| | | |
|---|---|---|
| CN | 104836217 A | 8/2015 |
| TW | 200729453 | 8/2007 |
| TW | 200915528 | 4/2009 |

*Primary Examiner* — Scott Bauer
(74) *Attorney, Agent, or Firm* — Winston Hsu (57) ABSTRACT

An electrostatic discharge (ESD) protection apparatus includes: an ESD circuit, arranged to perform ESD protection, wherein the ESD circuit includes a first Field Effect Transistor (FET) arranged to release ESD energy; a detection circuit, arranged to perform detection to control the ESD protection apparatus to selectively operate in one of a normal mode and a discharge mode; and a logic circuit, arranged to withstand any oscillation due to resistance-inductance-capacitance (RLC) characteristics of the detection circuit. In the detection circuit, different subsets of a plurality of resistors are respectively combined with a portion of a first serial connection circuit, an entirety of the first serial connection circuit, and a second FET to form different serial connection circuits, to configure the second FET to approach a state of being completely turned off in the normal mode.

20 Claims, 5 Drawing Sheets

(56) References Cited

U.S. PATENT DOCUMENTS

2015/0229125 A1   8/2015 Kato
2016/0241021 A1   8/2016 Wang
2017/0221879 A1*  8/2017 Wang ................. H01L 27/0285

* cited by examiner

ELECTROSTATIC DISCHARGE PROTECTION APPARATUS

BACKGROUND OF THE INVENTION

1. Field of the Invention

The present invention relates to circuit protections, and more particularly, to an electrostatic discharge (ESD) protection apparatus.

2. Description of the Prior Art

A transistor can be used to release ESD energy applied to a target circuit, in order to prevent the target circuit from being damaged. This ESD protection mechanism may have some problems, however. For example, improper controls may cause the transistor to operate incorrectly, resulting in current leakage problems at the transistor.

Figure 1:
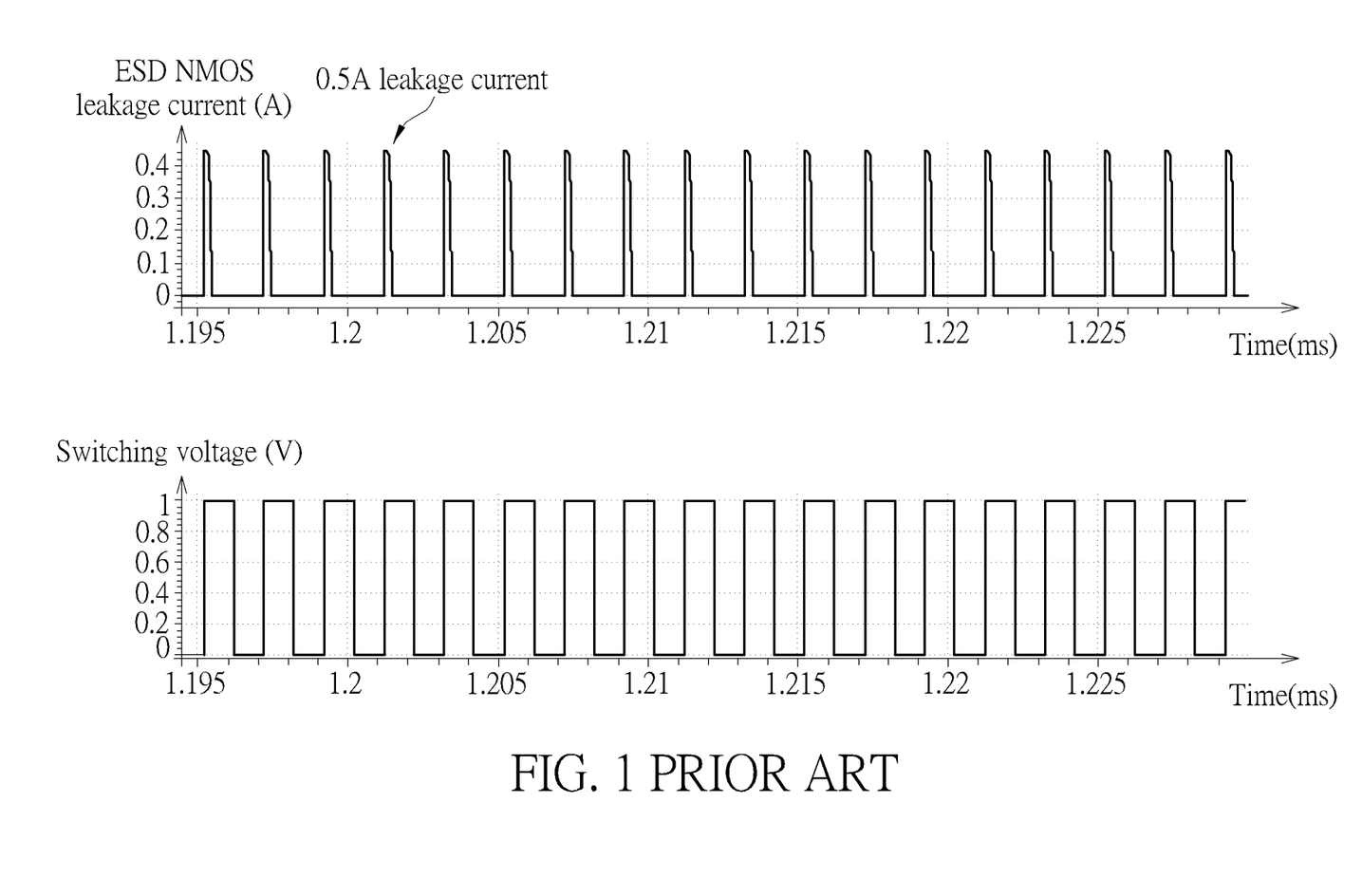
FIG. 1 is a diagram illustrating a related art current leakage problem.

FIG. 1 is a diagram illustrating a related art current leakage problem. For better comprehension, it is assumed that the normal functions of the target circuit may depend on the switching voltage, which is shown in the lower half of FIG. 1. The horizontal axis represents the elapsed time in milliseconds (ms) and the vertical axis represents the magnitude of the switching voltage in Volts (V). The switching voltage may be switched between 0-5 Volts in order to generate a waveform of periodic square waves, wherein the period of each periodic square wave can be 2 nanoseconds (ns), and the duration of each rising edge and falling edge of each square wave can be 1 nanosecond. When the switching voltage is applied to related art ESD protection mechanisms, the rising and falling edges will cause the transistor to be periodically turned on, wherein this period is also 2 nanoseconds. Note that when the target circuit is performing normal operations, the transistor should remain in the turned-off state unless there is an ESD event. Improper control resulting from related art techniques will, however, make the transistor switch to the turned-on state. In the graph illustrated in the upper half of FIG. 1, the vertical axis represents the amount of leakage current of the transistor (e.g. an N-type metal oxide semiconductor field effect transistor (NMOSFET)), in units of amperes (A). For better comprehension, the vertical axis is labeled "ESD NMOS leakage current (A)". Each time the transistor is turned on, the duration may reach 0.25 nanoseconds or longer, meaning that current leakage from the transistor may last for 0.25 nanoseconds or longer. Further, each time the transistor is turned on, the magnitude of this leakage current may reach 0.5 amperes or more. The upper half of FIG. 1 is labeled "0.5 A leakage current" to emphasize this phenomenon.

When incorrect operations of the transistor lead to extra power consumption, the power for driving the target circuit will also correspondingly be increased. When there are N target circuits in an integrated circuit (IC) (wherein N can be any integer larger than 1, such as 200), the total power consumption will be N times the power consumption mentioned above, wherein one of the target circuits may need to be protected by at least one (e.g. one or more) replica of the transistor. In this way, the related art ESD protection mechanism may cause electronic devices equipped with the above IC to have high IC power consumption. Hence, there is a need for a novel mechanism to improve the existing ESD protection control mechanism.

SUMMARY OF THE INVENTION

An objective of the present invention is to provide an ESD protection apparatus in order to solve the problems existing in the related arts.

Another objective of the present invention is to provide an ESD protection apparatus in order to reduce current leakage and power consumption.

According to at least one embodiment of the present invention, an ESD protection apparatus is provided. The ESD protection apparatus comprises an ESD circuit, a detection circuit and a logic circuit. The ESD circuit is coupled between a first reference voltage wire and a second reference voltage wire of the ESD protection apparatus. The ESD circuit is arranged to perform ESD protection between the first reference voltage wire and the second reference voltage wire. The first reference voltage wire is electrically connected to a first reference voltage, the second reference voltage wire is electrically connected to a second reference voltage, and the ESD circuit comprises a first field effect transistor (FET). The first FET is arranged to release ESD energy, wherein a gate terminal of the first FET is used as a control terminal of the ESD circuit. The detection circuit is coupled between the first reference voltage wire and the second reference voltage wire. The detection circuit is arranged to perform detection between the first reference voltage wire and the second reference voltage wire for controlling the ESD protection apparatus to selectively operate in one of a normal mode and a discharge mode. The detection circuit comprises a plurality of FETs, a second FET and a plurality of resistors. A gate terminal and a drain terminal of each FET of the plurality of FETs are electrically connected to each other in order to simulate a two-terminal element, and a plurality of two-terminal elements simulated by the plurality of FETs are serially-coupled to each other in order to forma first series circuit. The second FET is arranged to generate a detection signal based on circuit arrangements in the detection circuit, wherein the control terminal receives a derivative signal of the detection signal. Different subsets of the plurality of resistors are respectively combined with a portion of the first series circuit, an entirety of the first series circuit and the second FET to form different series circuits, in order to configure the second FET to approach a completely turned-off state in the normal mode. The logic circuit is coupled between the ESD circuit and the detection circuit. The logic circuit is arranged to generate the derivative signal and to withstand any oscillation resulting from resistance-inductance-capacitance (RLC) characteristics in the detection circuit, wherein an output terminal of the logic circuit is electrically connected to the control terminal, in order to output the derivative signal to the control terminal.

The ESD protection apparatus of the present invention may solve problems of the related arts without introducing unwanted side effects, or in a way that is less likely to introduce a side effect. For example, the ESD protection apparatus of the present invention may tightly turn off the second FET in the normal mode, making the amount of current leakage in the first FET very tiny. Compared with related art mechanisms, the ESD protection apparatus of the present invention may greatly reduce the power consumption.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
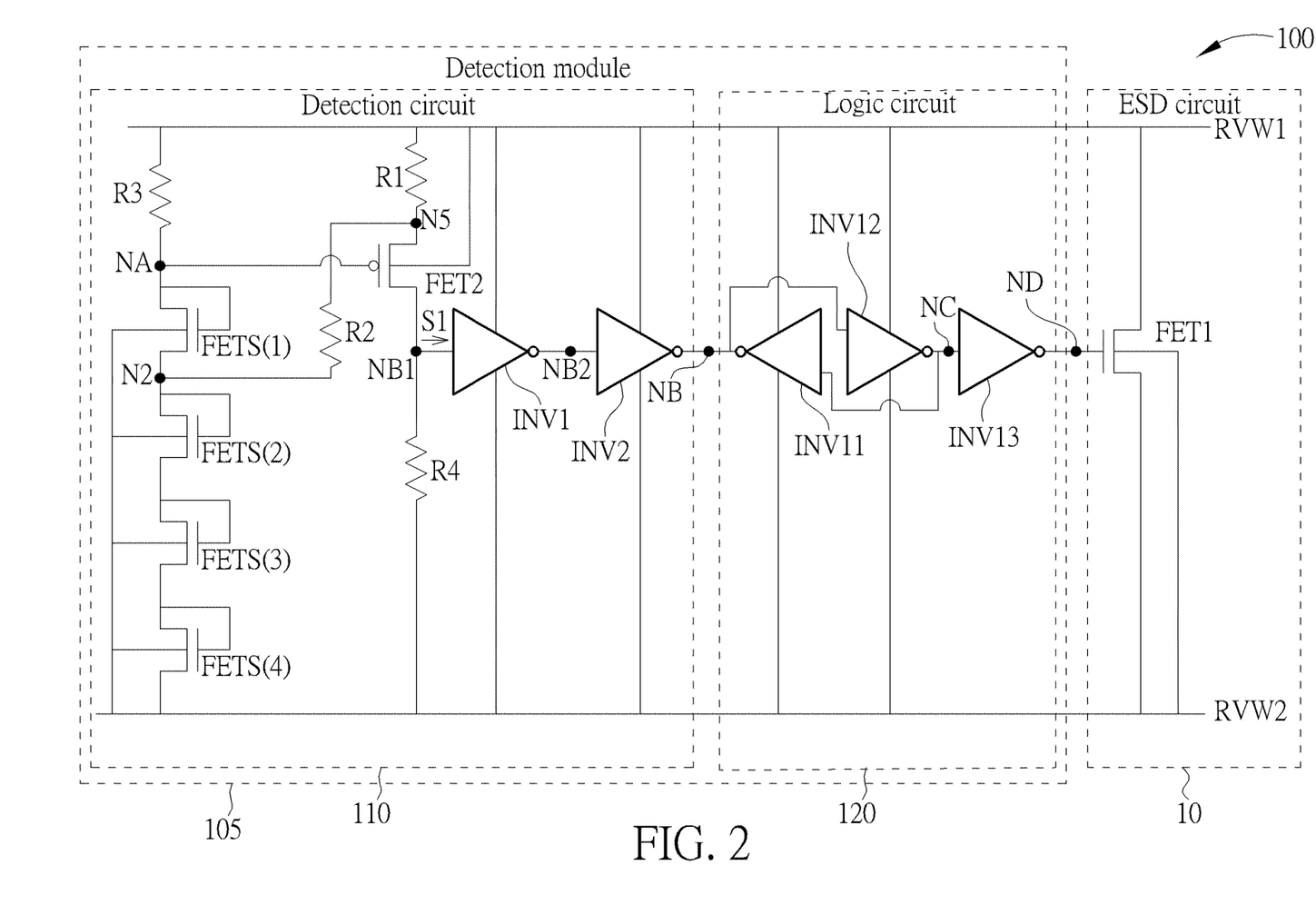
FIG. 2 is a diagram illustrating an electrostatic discharge (ESD) protection apparatus according to an embodiment of the present invention.

FIG. 2 is a diagram illustrating an electrostatic discharge (ESD) protection apparatus 100 according to an embodiment of the present invention. The ESD protection apparatus 100 may comprise an ESD circuit 10 and a detection module 105, and the detection module 105 may comprise a detection circuit 110 and a logic circuit 120. The logic circuit 120 may be coupled between the ESD circuit 10 and the detection circuit 110. Further, the ESD circuit 10, the detection circuit 110, and the logic circuit 120 may share a first reference voltage wire RVW1 and a second reference voltage wire RVW2 of the ESD protection apparatus 100. In addition, the ESD circuit 10, the detection circuit 110, and the logic circuit 120 may each be coupled between the first reference voltage wire RVW1 and the second reference voltage wire RVW2, wherein the first reference voltage wire RVW1 is electrically connected to a first reference voltage (e.g. a driving voltage, or any other type of reference voltages), and the second reference voltage wire RVW2 is electrically connected to a second reference voltage (e.g. a ground voltage, or any other type of reference voltages).

As shown in FIG. 2, the ESD circuit 10 may comprise a first field effect transistor (FET) FET1. The first FET FET1 may be implemented as a metal oxide semiconductor field effect transistor (MOSFET), such as an N-type MOSFET (NMOSFET), but the present invention is not limited thereto. The detection circuit 110 may comprise a plurality of FETs {FETS(1), FETS(2), FETS(3), FETS(4)}, a second FET FET2 and a plurality of resistors {R1, R2, R3, R4}, and may further comprise at least one inverter such as two inverters {INV1, INV2}. The gate terminal and drain terminal of each FET of the plurality of FETs {FETS(1), FETS(2), FETS(3), FETS(4)} are electrically connected to each other, in order to simulate a two-terminal element. In addition, a plurality of two-terminal elements simulated by the plurality of FETs {FETS(1), FETS(2), FETS(3), FETS(4)} are serially-coupled to one another in order to form a first series circuit. For example, each of the plurality of FETs {FETS(1), FETS(2), FETS(3), FETS(4)} may be implemented as a MOSFET such as an NMOSFET, and the second FET FET2 may be implemented as a MOSFET such as a P-type MOSFET (PMOSFET). The present invention is not limited thereto, however. The logic circuit 120 may comprise at least one inverter, such as three inverters {INV11, INV12, INV13}.

According to this embodiment, the ESD circuit 10 may be arranged to perform ESD protection between the first reference voltage wire RVW1 and the second reference voltage wire RVW2. The first FET FET1 may be arranged to release ESD energy, wherein the gate terminal of the first FET FET1 may be used as a control terminal of the ESD circuit 10, such as the terminal at the right-hand side of the node ND.

Further, the detection circuit 110 may be arranged to perform detection between the first reference voltage wire RVW1 and the second reference voltage wire RVW2, in order to control the ESD protection apparatus 100 to selectively operate in one of a normal mode and a discharge mode. In the normal mode, the ESD protection apparatus 100 may stay in an inactive state in order to allow a target circuit (such as that mentioned above) to perform its normal functions, wherein the detection module 105 may control the first FET FET1 to remain in the turned-off state without the current leakage problem of the related art. In another example, in the discharge mode, the ESD protection apparatus 100 may stay in an active state, especially by releasing the ESD energy via the first FET FET1, in order to prevent the target circuit from being damaged.

In order to prevent the current leakage problem, the present invention provides a properly designed circuit mechanism, such as the mechanism shown in FIG. 2. In this embodiment, the second FET FET2 may generate a detection signal S1 based on circuit arrangements in the detection circuit 110, wherein the control terminal receives a derivative signal of the detection signal S1. Different subsets of the plurality of resistors {R1, R2, R3, R4} are respectively combined with a portion of the first series circuit (e.g. the FETs FETS(2), FETS(3), and FETS(4)), the entirety of the first series circuit (e.g. the FETs FETS(1), FETS(2), FETS(3), and FETS(4)), and the second FET FET2 to form different series circuits in order to configure the second FET FET2 to approach a completely turned-off state in the normal mode.

In one example, each above-mentioned series circuit is electrically connected between the first reference voltage wire RVW1 and the second reference voltage wire RVW2. The plurality of resistors may comprise a first resistor, a second resistor, a third resistor and a fourth resistor.

For better comprehension, the resistors R1, R2, R3 and R4 may be examples of the first resistor, the second resistor, the third resistor, and the fourth resistor, respectively. The first resistor R1, the second resistor R2, and the X-th two-terminal element to the last two-terminal element in the first series circuit (e.g. the X-th FET FETS(X) in the plurality of FETs to the last FET FETS (Xmax) in the plurality of FETs, counted starting from the uppermost one) is serially-coupled to each other in order to form a second series circuit, wherein the symbol "Xmax" represents the total of the plurality of FETs and the symbol X represents an integer larger than 1, e.g. X=2. Further, the third resistor R3 and the first series circuit (e.g. the FETS FETS(1), FETS(2), FETS(3), and FETS(4)) are serially-coupled to each other in order to forma third series circuit. In addition, the first resistor R1, the second FET FET2 and the fourth resistor R4 are serially-coupled to form a fourth series circuit. In this way, it can be seen from the mechanism shown in FIG. 2 that each series circuit of the second series circuit (e.g. the first resistor R1, the second resistor R2 and the X-th to last FETs {FETS(X), . . . , FETS(Xmax)}, wherein X=2 and Xmax=4 in this embodiment), the third series circuit (e.g. the third resistor R3 and the FETs {FETS(1), . . . , FETS(Xmax)}, wherein Xmax=4 in this embodiment), and the fourth series circuit (e.g. the first resistor R1, the second FET FET2 and the fourth resistor R4) is electrically connected between the first reference voltage wire RVW1 and the second reference voltage wire RVW2.

As shown in FIG. 2, the gate terminal of the second FET FET2 is electrically connected to the terminal between the third resistor R3 and the first series circuit, such as the terminal located at the node NA. The terminal between the first resistor R1 and the second FET FET2 (e.g. the terminal at the node N5) is coupled to the terminal between the (X−1)-th two-terminal element and the X-th two-terminal element in the first series circuit (which may be respectively simulated by the (X−1)-th FET FETS(X−1) and the X-th FET FETS(X); in this embodiment, X=2) via second resistor R2, such as the terminal at the node N2. A first inverter INV1 in the detection circuit 110 has an input terminal and an output terminal, wherein the input terminal of the first inverter INV1 (e.g. the terminal located at the right-hand side of the node NB1) is electrically connected to the terminal between the second FET FET2 and the fourth resistor R4 (e.g. the terminal located at the node NB1) in order to receive the detection signal S1. A second inverter INV2 in the detection circuit 110 has an input terminal and an output terminal, wherein the input terminal of the second inverter INV2 (e.g. the terminal at the right-hand side of the node NB2) is electrically connected to the output terminal of the first inverter INV1 (e.g. the terminal at the left-hand side of the node NB2), and the logic circuit 120 is coupled between the control terminal of the ESD circuit 10 (e.g. the terminal at the right-hand side of the node ND) and the output terminal of the second inverter INV2 (e.g. the terminal at the left-hand side of the node NB).

The logic circuit 120 may be arranged to generate the derivative signal and withstand any oscillation resulting from the resistance-inductance-capacitance (RLC) characteristics in the detection circuit 110, wherein an output terminal of the logic circuit 120 (e.g. the terminal at the left-hand side of the node ND) is electrically connected to the control terminal of the FET FET1 (e.g. the terminal at the right-hand side of the node ND), in order to output the derivative signal to the control terminal of the FET FET1.

One of the first inverter INV11 and second inverter INV12 in the logic circuit 120 may receive the output signal of the other of the first inverter INV11 and the second inverter INV12. For example, an input terminal of the first inverter INV11 is electrically connected to an output terminal of the second inverter INV12, and an input terminal of the second inverter INV12 is electrically connected to an output terminal of the first inverter INV11. Further, the input terminal of the second inverter INV12 may be coupled to the detection signal S1 via the output terminal of the detection circuit 110 (e.g. the terminal at the left-hand side of the node NB), and more specifically, via the inverters INV1 and INV2 that are coupled to the terminal at the node NB1. Further, the control terminal (e.g. the terminal at the right-hand side of the node ND) may be coupled to the output terminal of the second inverter INV12 in the logic circuit 120 (e.g. the terminal at the left-hand side of the node NC). For example, a third inverter INV13 in the logic circuit 120 has an input terminal and an output terminal, wherein the input terminal of the third inverter INV13 (e.g. the terminal at the right-hand side of the node NC) is electrically connected to the output terminal of the second inverter INV12 (e.g. the terminal at the left-hand side of the node NC), and the output terminal of the third inverter INV13 (e.g. the terminal at the left-hand side of the node ND) is electrically connected to the control terminal (e.g. the terminal at the right-hand side terminal of the node ND).

According to this embodiment, regarding configuring the second FET FET2 to approach the completely turned-off state in the normal mode, when a non-ESD pulse is applied between the first reference voltage wire RVW1 and the second reference voltage wire RVW2, the duration of current leakage of the first FET FET1 in the normal mode in response to the non-ESD pulse is less than 0.2 nanoseconds, which is less than in the related art techniques. Further, when a non-ESD pulse (such as that mentioned above) is applied between the first reference voltage wire RVW1 and the second reference voltage wire RVW2, the amount of leakage current of the first FET FET1 in the normal mode in response to the non-ESD pulse is less than 200 milliamperes, which is much less than in the related art techniques.

Based on the circuit mechanism of the logic circuit 120 shown in FIG. 2, the logic circuit 120 may reduce the oscillations as mentioned above. This is merely for illustrative purposes, however, and is not a limitation of the present invention. According to some embodiments, the logic circuit 120 may be implemented as any other type of logic circuit. In an embodiment, the logic circuit 120 may comprise a level shifter, and the level shifter may be arranged to perform level shift operations, wherein the level shifter has an input terminal and an output terminal. The input terminal of the level shifter may be coupled to the detection signal S1 via the output terminal of the detection circuit 110 (e.g. coupled to the terminal at the node NB1 via the inverters INV1 and INV2), and the output terminal of the level shifter may be electrically connected to the control terminal (e.g. the terminal at the right-hand side of the node ND). Due to characteristics of the level shifter, the ESD protection apparatus 100 may utilize the level shifter to block any oscillation resulting from resistance-inductance-capacitance (RLC) the characteristics in the detection circuit 110.

Figure 3:
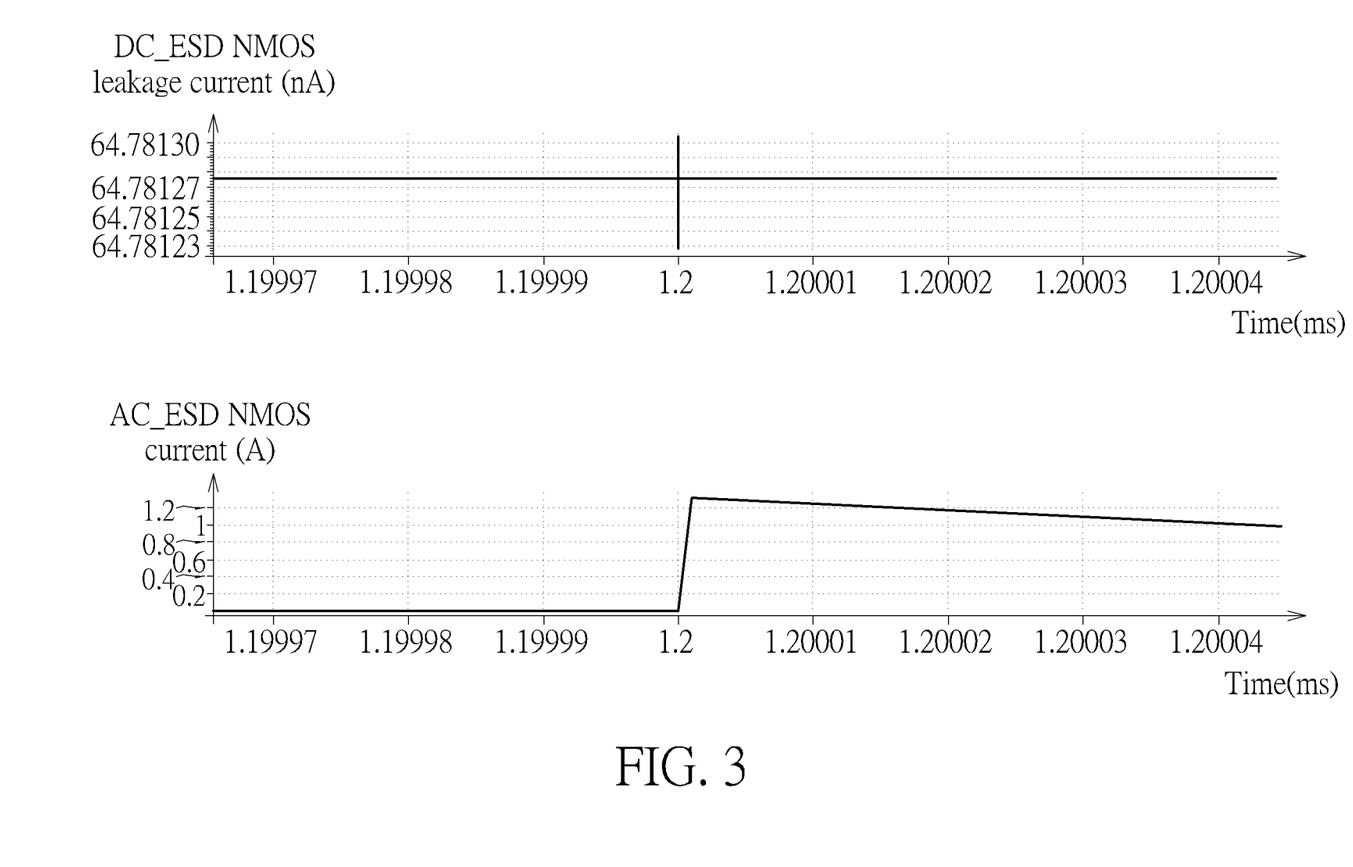
FIG. 3 is a diagram illustrating current characteristics of the ESD protection apparatus shown in FIG. 2 in a discharge mode according to an embodiment of the present invention.

FIG. 3 is a diagram illustrating current characteristics of the ESD protection apparatus 100 shown in FIG. 2 in a discharge mode according to an embodiment of the present invention. In the graph shown in the upper half of FIG. 3, the vertical axis represents the current of the first FET FET1 in DC analysis, wherein the first FET FET1 may be an NMOSFET. For better comprehension, the vertical axis is labeled "DC_ESD NMOS leakage current (nA)". The unit "nA" of the current suggests that the leakage current in the normal operation is very tiny. In the graph shown in the lower half of FIG. 3, the vertical axis represents the current of the first FET FET1 in AC analysis, wherein the first FET FET1 may be an NMOSFET. For better comprehension, "AC_ESD NMOS current (A)" is labeled on the vertical axis. The unit "A" of the current suggests that when an ESD event occurs, the ESD current released by the ESD protection apparatus 100 can be large, and may even reach 1.33 A under the condition of human body model (HBM) 2 KV, for example. The current-related characteristic shown in FIG. 3 indicates that the ESD protection apparatus 100 may correctly operate in the discharge mode in order to protect the target circuit.

Figure 4:
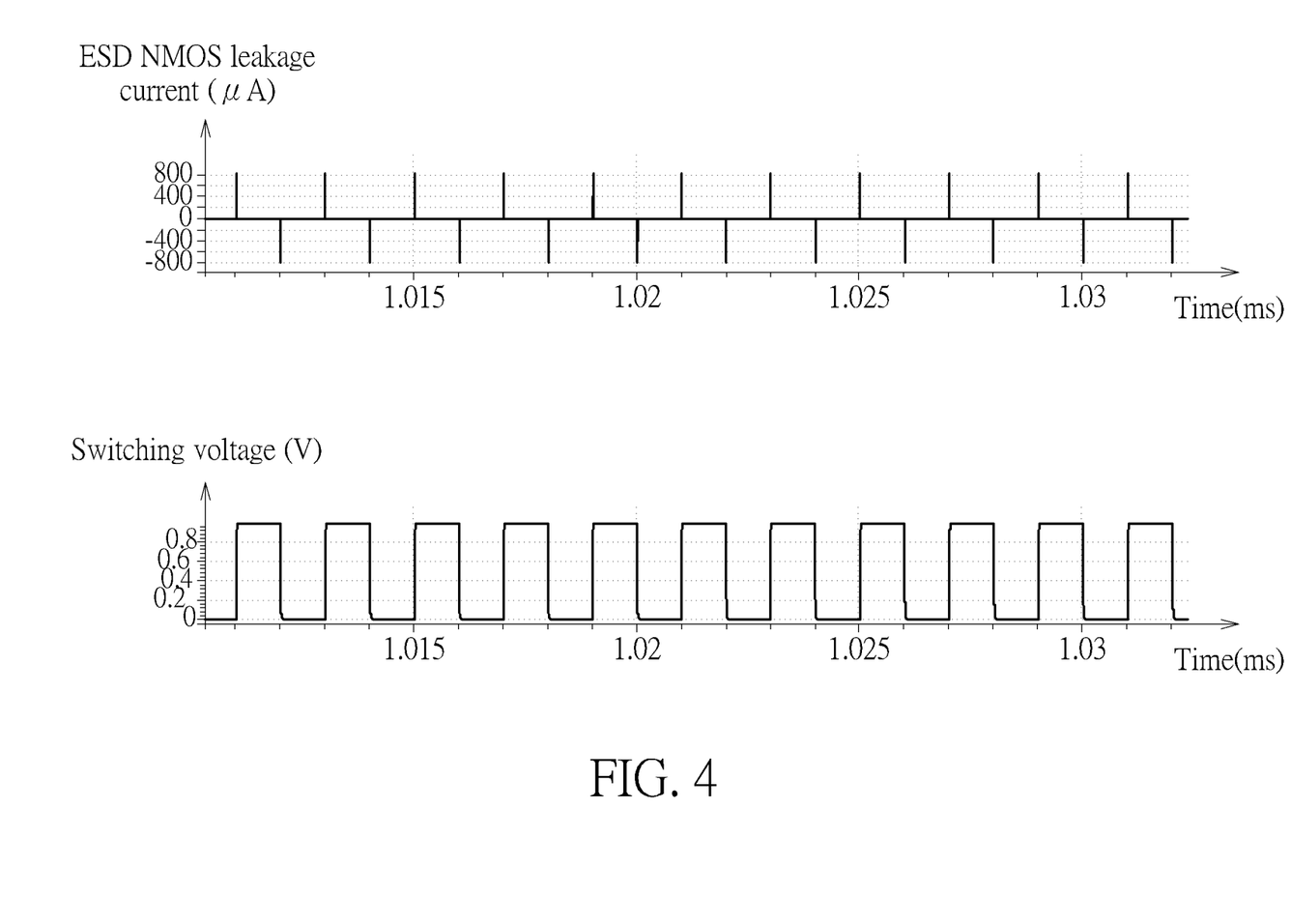
FIG. 4 is a diagram illustrating a curve of characteristics of a tiny leakage current/leakage duration of the ESD protection apparatus shown in FIG. 2 in a normal mode according to an embodiment of the present invention.

FIG. 4 is a diagram illustrating a curve of characteristics of a tiny leakage current/leakage duration of the ESD protection apparatus 100 shown in FIG. 2 in the normal mode according to an embodiment of the present invention. The switching voltage shown in the graph in the lower half of FIG. 4 is similar to that shown in the graph in the lower half of FIG. 1, except there is a little difference in the scale of the horizontal axes. Any pulse in the periodic square wave of the switching voltage shown in the graph in the lower half of FIG. 4 may be an example of the above-mentioned non-ESD pulse. In the vertical axis of the graph shown in the upper half of FIG. 4, the unit of the leakage current of the first FET FET1 (e.g. an NMOSFET) is microamperes (μA). For better comprehension, the vertical axis is marked "ESD NMOS leakage current (μA)". Regarding configuring the second FET FET2 to approach the completely turned-off state in the normal mode, when the non-ESD pulse is applied between the first reference voltage wire RVW1 and the second reference voltage wire RVW2, the duration of the current leakage of the first FET FET1 in the normal mode in response to the non-ESD pulse is less than 0.1 nanoseconds. Hence, in this embodiment, the duration of the current leakage of the first FET FET1 is less than in related art techniques (e.g. 0.25 nanoseconds).

Regarding configuring the second FET FET2 to approach the completely turned-off state in the normal mode, when the non-ESD pulse is applied between the first reference voltage wire RVW1 and the second reference voltage wire RVW2, the amount of current leakage of the first FET FET1 in the normal mode in response to the non-ESD pulse (which is typically 800 microamperes or 0.8 milliamperes) may be at least smaller than 1 milliampere. Hence, in the mechanism of the present invention, the amount of current leakage of the first FET FET1 is much less than in the related art techniques.

Figure 5:
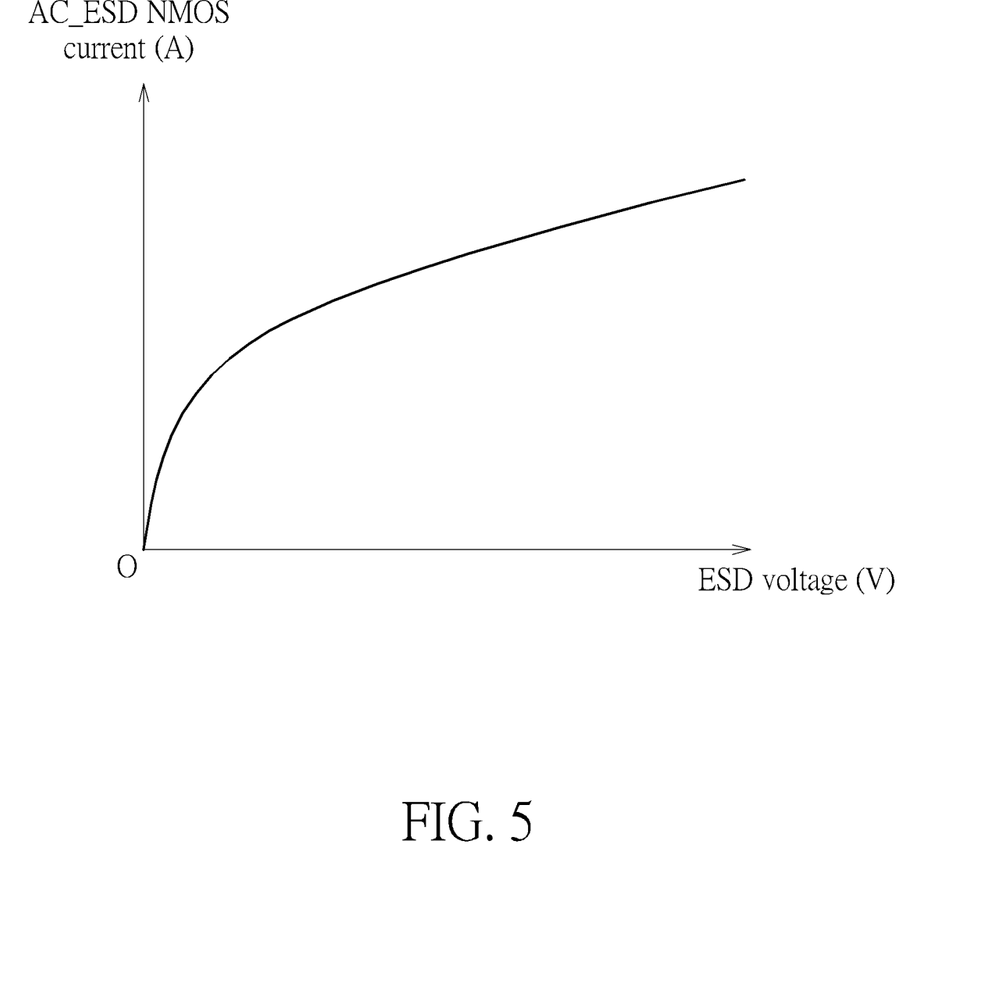
FIG. 5 is a diagram illustrating a current-voltage curve of the ESD protection apparatus shown in FIG. 2 according to an embodiment of the present invention.

FIG. 5 is a diagram illustrating a current-voltage curve of the ESD protection apparatus 100 shown in FIG. 2 according to an embodiment of the present invention. The curve passes through the origin point O, which shows that the current increases from zero when the voltage increases from zero. For example, at the moment the ESD energy is applied to the target circuit, the ESD protection apparatus 100 may control the first FET FET1 to immediately release the ESD energy. Hence, the ESD protection apparatus 100 can achieve an excellent ESD protection performance.

According to some embodiments, in order to tightly turn off the second FET FET2 in the normal mode, the circuit mechanism in the detection circuit 110 may be designed according to the following equations:

$$VCC-(I_{sub4}*R3)>VCC-(I_{sub3}*R1) \quad (1);$$

$$(I_{R3}*R3)+4V_{th}<(I_{R1}*(R1+R2))+3V_{th} \quad (2);$$

wherein the symbol "VCC" represents the driving voltage; the italic symbols "R1", "R2", "R3" and "R4" respectively represent the resistance values of the resistors R1, R2, R3 and R4; the symbols "$I_{sub3}$" and "$I_{sub4}$" respectively represent the current passing through the three FETs FETS(2), FETS(3), and FETS(4) and the current passing through the four FETs FETS(1), FETS(2), FETS(3), and FETS(4); the symbols "$I_{R1}$" and "$I_{R3}$" respectively represent the current passing through the resistor R1 and the current passing through the resistor R3; and the symbol "$V_{th}$" represents the turned-on voltage threshold of any FET of the FETs FETS (1), FETS(2), FETS(3), and FETS(4). Some features in this embodiment that are similar to those of the previous embodiments are omitted here for brevity.

Some details regarding the curve passing through the origin O shown in FIG. 5 are further described as follows. The horizontal axis in FIG. 5 represents the ESD voltage. For the ESD protection apparatus 100 shown in FIG. 2, the first FET FET1 can release the ESD current even if the ESD voltage does not exceed the turned-on voltage threshold $V_{th}$ (or a multiple thereof). For example, the ESD protection apparatus 100 may utilize the over-voltage occurring during an ESD event to make an inner circuit (e.g. a FET) of the detection circuit 110 generate current, in order to generate the detection signal S1 as a trigger signal for triggering the follow-up stages of circuits. Hence, the first FET FET1 is turned on at the moment the trigger signal is provided, wherein the turned-on characteristic may be represented by the curve shown in FIG. 5.

In the mechanism shown in FIG. 2, the plurality of FETs are depicted as four FETs {FETS(1), FETS(2), FETS(3), FETS(4)}, and the plurality of resistors are depicted as four resistors {R1, R2, R3, R4}; although the present invention is not limited thereto. For example, the number of the plurality of FETs may vary, and/or the number of the plurality of resistors may vary. Further, the above-mentioned at least one inverter in the detection circuit 110 is depicted as two inverters {INV1, INV2}, and the above-mentioned at least one inverter in the logic circuit 120 is depicted as three inverters {INV11, INV12, INV13}, but the present invention is not limited thereto, and the number of the inverters may be changed.

According to some embodiments, the above-mentioned different series circuit may comprise the second series circuit, the third series circuit and the fourth series circuit. In addition, a first subset of the plurality of resistors (e.g. the resistors R1 and R2) and the portion of the first series circuit (e.g. the FETs FETS(2), FETS(3), and FETS (4)) form the second series circuit; a second subset of the plurality of resistors (e.g. the resistor R3) and the entirety of the first series circuit (e.g. the FETs FETS(1), FETS(2), FETS(3), and FETS(4)) form the third series circuit; and a third subset of the plurality of resistors (e.g. the resistors R1 and R4) and the second FET FET2 form the fourth series circuit. For example, the first subset of the plurality of resistors may comprise two or more resistors, such as the first resistor R1 and the second resistor R2; and the second subset of the plurality of resistors may comprise one or more resistors, such as the third resistor R3. In addition, the third subset of the plurality of resistors may comprise two or more resistors, such as the first resistor R1 and the fourth resistor R4. In another example, any resistor in any subset of the three subsets of the plurality of resistors, such as any of the resistors R1, R2, R3 and R4, may be replaced with multiple resistors. Further, in the first subset of the plurality of resistors (e.g. the resistors R1 and R2), there is no resistor belonging to the second subset of the plurality of resistors (e.g. the resistor R3); in the second subset of the plurality of resistors (e.g. the resistor R3), there is no resistor belonging to the first subset of the plurality of resistors (e.g. the resistors R1 and R2); and there is at least one resistor (e.g. the resistor R1) that belongs to the third subset of the plurality of resistors (e.g. resistor R1 and R4) in the first subset of the plurality of resistors (e.g. the resistors R1 and R2).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electrostatic discharge (ESD) protection apparatus, comprising:

an ESD circuit, coupled between a first reference voltage wire and a second reference voltage wire of the ESD protection apparatus, the ESD circuit arranged to perform ESD protection between the first reference voltage wire and the second reference voltage wire, wherein the first reference voltage wire is electrically connected to a first reference voltage, the second reference voltage wire is electrically connected to a second reference voltage, and the ESD circuit comprises:
  a first field effect transistor (FET), arranged to release ESD energy, wherein a gate terminal of the first FET is used as a control terminal of the ESD circuit;
a detection circuit, coupled between the first reference voltage wire and the second reference voltage wire, the detection circuit arranged to perform detection between the first reference voltage wire and the second reference voltage wire, in order to control the ESD protection apparatus to selectively operate in one of a normal mode and a discharge mode, wherein the detection circuit comprises:
- a plurality of FETs, wherein a gate terminal and a drain terminal of each FET of the plurality of FETs are electrically connected to each other in order to simulate a two-terminal element, and a plurality of two-terminal elements simulated by the plurality of FETs are serially-coupled to each other in order to form a first series circuit;
- a second FET, arranged to generate a detection signal based on circuit arrangements in the detection circuit, wherein the control terminal receives a derivative signal of the detection signal; and
- a plurality of resistors, wherein different subsets of the plurality of resistors are respectively combined with a portion of the first series circuit, an entirety of the first series circuit and the second FET to form different series circuits, in order to configure the second FET to approach a completely turned-off state in the normal mode; and
- a logic circuit, coupled between the ESD circuit and the detection circuit, the logic circuit arranged to generate the derivative signal and to withstand any oscillation resulting from resistance-inductance-capacitance (RLC) characteristics in the detection circuit, wherein an output terminal of the logic circuit is electrically connected to the control terminal, in order to output the derivative signal to the control terminal.

2. The ESD protection apparatus of claim 1, wherein each series circuit of the different series circuits is electrically connected between the first reference voltage wire and the second reference voltage wire.

3. The ESD protection apparatus of claim 1, wherein the plurality of resistors comprises:
- a first resistor and a second resistor, wherein the first resistor, the second resistor, and X-th to last two-terminal elements in the first series circuit are serially-coupled to one another in order to form a second series circuit, wherein the symbol X represents an integer larger than 1;
- a third resistor, wherein the third resistor and the first series circuit are serially-coupled to each other in order to form a third series circuit; and
- a fourth resistor, wherein the first resistor, the second FET and the fourth resistor are serially-coupled to one another in order to form a fourth series circuit.

4. The ESD protection apparatus of claim 3, wherein X=2.

5. The ESD protection apparatus of claim 3, wherein each series circuit of the second series circuit, the third series circuit and the fourth series circuit is electrically connected between the first reference voltage wire and the second reference voltage wire.

6. The ESD protection apparatus of claim 3, wherein a gate terminal of the second FET is electrically connected to a terminal between the third resistor and the first series circuit.

7. The ESD protection apparatus of claim 3, wherein a terminal between the first resistor and the second FET is coupled to a terminal coupled between an (X−1)-th two-terminal element and the X-th two-terminal element in the first series circuit via the second resistor.

8. The ESD protection apparatus of claim 1, wherein the different series circuits comprise a second series circuit, a third series circuit and a fourth series circuit; and a first subset of the plurality of resistors and the portion of the first series circuit form the second series circuit, a second subset of the plurality of resistors and the entirety of the first series circuit form the third series circuit, and a third subset of the plurality of resistors and the second FET form the fourth series circuit.

9. The ESD protection apparatus of claim 8, wherein:
the first subset of the plurality of resistors comprises:
- a first resistor and a second resistor, wherein the first resistor, the second resistor, and X-th to last two-terminal elements in the first series circuit are serially-coupled to one another in order to form the second series circuit, wherein the symbol X represents an integer larger than 1;

the second subset of the plurality of resistors comprises:
- a third resistor, wherein the third resistor and the first series circuit are serially-coupled in order to form the third series circuit; and the third subset of the plurality of resistors comprises:
- the first resistor and a fourth resistor, wherein the first resistor, the second FET and the fourth resistor are serially-coupled in order to form the fourth series circuit.

10. The ESD protection apparatus of claim 8, wherein no resistor among the first subset of the plurality of resistors belongs to the second subset of the plurality of resistors; no resistor among the second subset of the plurality of resistors belongs to the first subset of the plurality of resistors; and there is at least one resistor among the first subset of the plurality of resistors that belongs to the third subset of the plurality of resistors.

11. The ESD protection apparatus of claim 1, wherein the detection circuit further comprises:
- a first inverter, having an input terminal and an output terminal, wherein the input terminal of the first inverter is electrically connected to the second FET in order to receive the detection signal.

12. The ESD protection apparatus of claim 11, wherein the input terminal of the first inverter is electrically connected to a terminal between the second FET and the fourth resistor.

13. The ESD protection apparatus of claim 11, wherein the detection circuit further comprises:
- a second inverter, having an input terminal and an output terminal, wherein the input terminal of the second inverter is electrically connected to the output terminal of the first inverter;
wherein the logic circuit is coupled between the control terminal of the ESD circuit and the output terminal of the second inverter.

14. The ESD protection apparatus of claim 1, wherein the logic circuit comprises:
- a first inverter and a second inverter, wherein an input terminal of the first inverter is electrically connected to an output terminal of the second inverter, an input terminal of the second inverter is electrically connected to an output terminal of the first inverter, and the input terminal of the second inverter is coupled to the detection signal via an output terminal of the detection circuit, wherein the control terminal is coupled to the output terminal of the second inverter.

15. The ESD protection apparatus of claim 14, wherein the logic circuit further comprises:
- a third inverter, having an input terminal and an output terminal, wherein the input terminal of the third inverter is electrically connected to the output terminal of the second inverter, and the output terminal of the third inverter is electrically connected to the control terminal.

16. The ESD protection apparatus of claim 1, wherein the logic circuit comprises:
   a level shifter, arranged to perform level shifting operations, wherein the level shifter has an input terminal and an output terminal, the input terminal of the level shifter is coupled to the detection signal via an output terminal of the detection circuit, and the output terminal of the level shifter is electrically connected to the control terminal;
   wherein the ESD protection apparatus utilizes the level shifter to block any oscillation resulting from resistance-inductance-capacitance (RLC) characteristics in the detection circuit.

17. The ESD protection apparatus of claim 1, wherein when the second FET is configured to approach the completely turned-off state in the normal mode, and when a non-ESD pulse is applied between the first reference voltage wire and the second reference voltage wire, a duration of current leakage of the first FET in the normal mode in response to the non-ESD pulse is less than 0.2 nanoseconds.

18. The ESD protection apparatus of claim 17, wherein when the second FET is configured to approach the completely turned-off state in the normal mode, and when the non-ESD pulse is applied between the first reference voltage wire and the second reference voltage wire, the duration of current leakage of the first FET in the normal mode in response to the non-ESD pulse is less than 0.1 nanoseconds.

19. The ESD protection apparatus of claim 1, wherein when the second FET is configured to approach the completely turned-off state in the normal mode, and when a non-ESD pulse is applied between the first reference voltage wire and the second reference voltage wire, an amount of leakage current of the first FET in the normal mode in response to the non-ESD pulse is less than 200 milliamperes.

20. The ESD protection apparatus of claim 19, wherein when the second FET is configured to approach the completely turned-off state in the normal mode, and when the non-ESD pulse is applied between the first reference voltage wire and the second reference voltage wire, the amount of current leakage of the first FET in the normal mode in response to the non-ESD pulse is less than 1 milliampere.

\* \* \* \* \*